United States Patent [19]

Riviezzo

[11] Patent Number: 5,010,836
[45] Date of Patent: Apr. 30, 1991

[54] LIVEWELL VALVE FOR FISHING BOATS

[75] Inventor: Anthony L. Riviezzo, Springfield, Mo.

[73] Assignee: Tracker Marine Corporation, Springfield, Mo.

[21] Appl. No.: 385,448

[22] Filed: Jul. 27, 1989

[51] Int. Cl.⁵ .............................................. B63B 35/14
[52] U.S. Cl. .................................... 114/255; 251/294; 251/304; 43/57
[58] Field of Search ................................ 251/294, 309; 114/183 R, 255

[56] References Cited

U.S. PATENT DOCUMENTS

| | | | |
|---|---|---|---|
| 3,206,163 | 9/1965 | Freed | 251/309 |
| 3,226,080 | 12/1965 | Lowrey | 251/309 |
| 3,525,363 | 8/1970 | Gore | 251/309 |
| 3,954,250 | 5/1976 | Grace | 251/294 |
| 4,033,280 | 7/1977 | Wood et al. | 114/255 |
| 4,319,664 | 3/1982 | Price et al. | 251/294 |
| 4,587,990 | 5/1986 | Pennell et al. | 251/309 |

Primary Examiner—Sherman Basinger
Assistant Examiner—Stephen P. Avila
Attorney, Agent, or Firm—Kokjer, Kircher, Bradley, Wharton, Bowman & Johnson

[57] ABSTRACT

A leak-tight rotatable plug valve for controlling water flow to and from a fish livewell in a fishing boat. The valve body has opposite ends connected with an inlet hose for fresh water intake and a drain hose extending from the livewell drain. A pump inlet passage in the valve body intersects with the valve flow passage and mounts a pump having its discharge connected with a supply hose leading to the livewell. When the valve is open, fresh water can be pumped to fill the livewell when the pump is active and the livewell can be drained when the pump is inactive. When the valve is closed, the pump recirculates water through the drain hose and supply hose to avoid stagnation and provide aeration for the livewell.

13 Claims, 2 Drawing Sheets

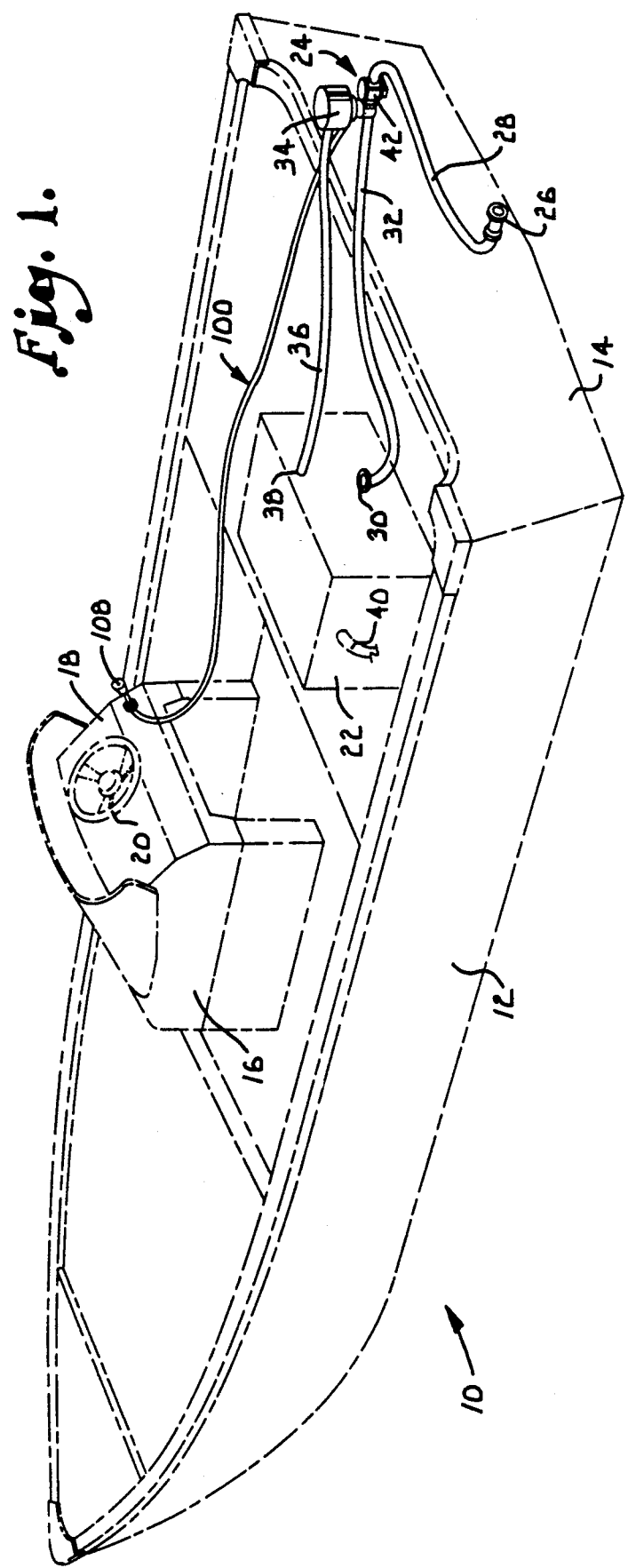

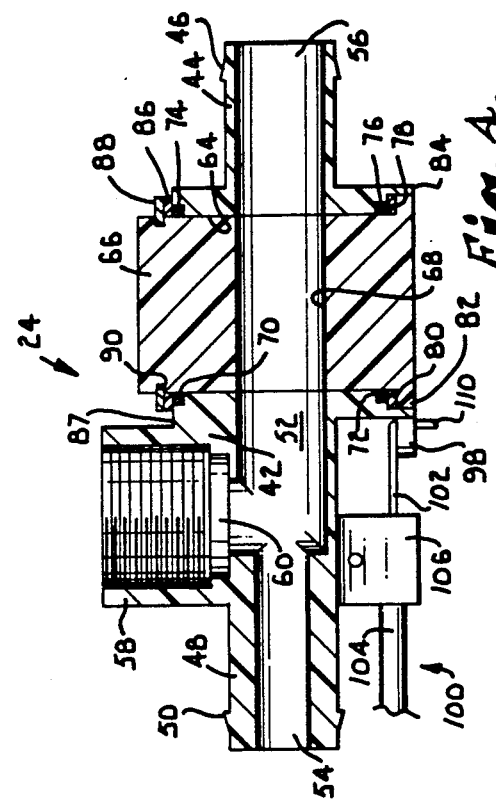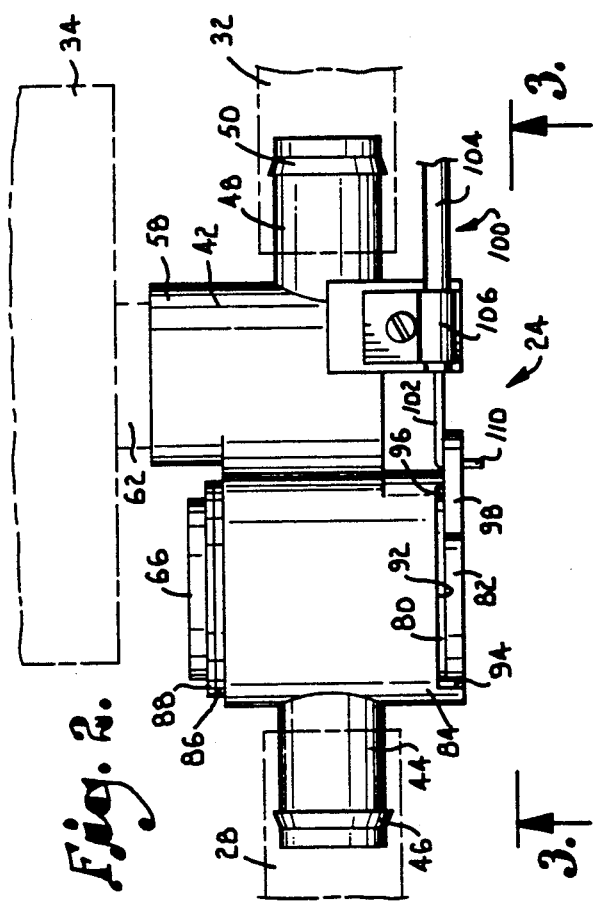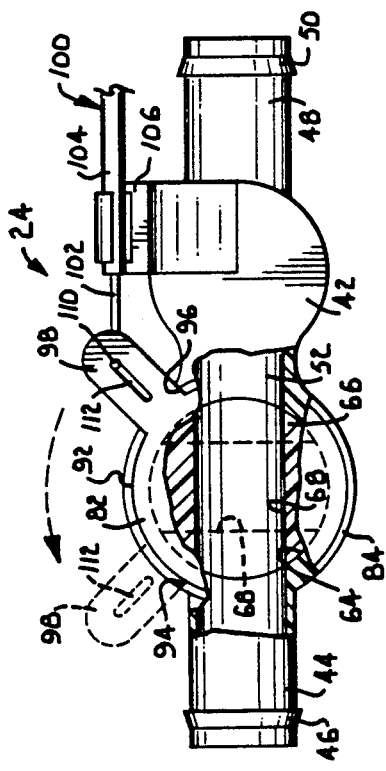

LIVEWELL VALVE FOR FISHING BOATS

BACKGROUND AND SUMMARY OF THE INVENTION

This invention relates generally to fishing boat equipment and more particularly to a valve which controls the flow of water to and from a livewell in a fishing boat.

It has become common in recent years for fishing boats to be equipped with livewells which are essentially water tanks for keeping fish that are caught. The livewell is usually supplied with fresh water and is aerated in order to assure that oxygen is made available to the fish that it holds. Circulation of the water in the livewell is another common feature that helps to maintain the fish in good condition. Pumps are used both to pump fresh water into the livewell from the lake or other body of water and to recirculate the water in the livewell. The livewell is typically drained when the boat is stored for any extended time period. The piping system for the livewell is usually equipped with one or more valves that control the flow of fresh water to the livewell, the drainage therefrom and the recirculation of water.

In the past, the valves that have been used for these purposes have been flapper valves that are subject to a variety of problems. Perhaps most notably, the valves are plagued by leakage that can result in significant depletion of the water in the livewell, and this in turn can kill or otherwise severely damage the fish in the livewell. Achieving a positive closure of the valve has been a significant problem that has plagued flapper type valves.

The present invention is directed to an improved valve that is constructed in a manner to control the flow of water to and from a livewell and to prevent leakage of water from the livewell or other parts of the plumbing system. It is an important feature of the invention that the valve includes a rotary valve element that is effectively sealed to the valve body in which it operates so that leakage is prevented and the livewell is not inadvertently drained to endanger the fish therein.

Another object of the invention is to provide a valve which is constructed and strategically situated in the plumbing system of the livewell such that it can control the flow of fresh incoming water to the livewell, the drainage of water therefrom, and recirculation of water in the livewell, all by selectively manipulating the valve between its open position and its closed position.

A further object of the invention is to provide a livewell valve of the character described which can be conveniently manipulated between its open and closed positions from the operator's station in the boat.

An additional object of the invention is to provide a livewell valve of the character described in which the rotation of the valve element is limited to 90° and which includes positive stops for the valve element at both its fully open and fully closed positions.

Yet another object of the invention is to provide a livewell valve of the character described which is constructed in a manner permitting the pump to be mounted directly on the valve body with the suction side of the pump communicating with the flow passage of the valve.

A still further object of the invention is to provide a livewell valve of the character described which is constructed simply and economically and yet function effectively in a substantially maintenance free manner over an extended operating life.

Other and further objects of the invention, together with the features of novelty appurtenant thereto, will appear in the course of the following description.

DESCRIPTION OF THE DRAWINGS

In the accompanying drawings which form a part of the specification and are to be read in conjunction therewith and in which like reference numerals are used to indicate like parts in the various views:

FIG. 1 is a diagramatic view of a fishing boat which is equipped with a livewell and with a valve constructed according to a preferred embodiment of the present invention;

FIG. 2 is a side elevational view on an enlarged scale of the valve shown in FIG. 1, with the pump and connection hoses shown fragmentarily in broken lines;

FIG. 3 is a bottom plan view of the valve taken generally along line 3—3 of FIG. 2 in the direction of the arrows, with a portion broken away for illustrative purposes and the broken lines depicting the closed position of the valve; and FIG. 4 is a sectional view taken through the valve on a vertical plane extending through the longitudinal axis of the valve body, with the valve in its open position.

DETAILED DESCRIPTION OF THE INVENTION

Referring now to the drawings in more detail and initially to FIG. 1, numeral 10 generally designates a bass boat or other fishing boat having a hull 12 and a stern 14. A control console 16 is provided near the center of the boat 10. The console 16 has a control panel 18 on which a steering wheel 20 and other controls are mounted. The operator of the boat normally occupies an operator's station immediately behind the console 16.

In accordance with the present invention, a livewell 22 is mounted in the boat 10 to hold the fish that are caught. The livewell 22 may be situated at any desired location and is shown located behind the operator's station at the control console 16 near the stern 14.

Numeral 24 generally identifies a valve which is constructed in accordance with the present invention and which serves to control the flow of water to and from the livewell 22. The stern 14 is equipped with a fresh water inlet fitting 26 located below the water level when the boat is in a lake or other body of water. A fresh water inlet hose 28 connects with the inlet fitting 26 and with the valve 24. The bottom of the livewell is provided with a drain fitting 30 which connects with a drain hose 32. The hose 32 also connects with valve 24. Mounted on top of the valve 24 is a conventional electrically operated pump 34 which connects with valve 24 on its suction side. The opposite or discharge side of pump 34 connects with a flexible supply hose 36 which extends to the livewell 22 and has a discharge nozzle 38 opening into the livewell at a location above the ordinary water level therein. The livewell 22 may also be equipped with an overflow tube 40.

Referring now more particularly to FIGS. 2-4, the valve 24 of the present invention has a valve body 42. One end of the valve body 42 presents a tubular connector 44 around which the fresh water inlet hose 28 may be placed and held by a connecting barb 46. Another tubular connector 48 is presented on the opposite end of the valve body 42. The drain hose 32 is slipped over connector 48 and held in place by a barb 50. Extending through the valve body 42 between the connectors 44 and 48 on its opposite ends is a flow passage 52. One end portion of the flow passage 52 is identified by numeral 54 and is located within the tubular connector 48. Extending through the tubular connector 44 at the opposite end of the valve body and connecting with portion 54 is another portion 56 of the flow passage 52. It is noted that the flow passage portion 56 is considerably larger in diameter than portion 54.

A tubular pump connector 58 is formed on top of the valve body 42. The pump connector 58 provides a pump inlet passage 60 which connects with the flow passage 52 at a location between the opposite ends of the flow passage and adjacent to the intersection between the flow passage portions 54 and 56. The connector 58 is internally threaded, and the pump 34 has an inlet 62 (FIG. 2) that may be threaded into the pump connector 58. The suction side of the pump 34 is connected with passage 60.

A cylindrical valve chamber 64 is formed in the valve body 32 at a location between connector 44 and the pump inlet passage 60. The valve chamber 64 intersects with flow passage 52. The longitudinal axis of the valve chamber 64 is vertical. The valve element of valve 24 is a cylindrical plug 66 which fits closely in the valve chamber 64 and is received therein for axial rotation. A cylindrical flow port 68 extends diametrically through the valve plug 66 and has the same diameter as the flow passage portion 56. The valve plug 66 may be rotated in chamber 64 through a 90° operating range between the open position shown in FIG. 4 and in solid lines in FIG. 3 and the closed position shown in broken lines in FIG. 3. In the open position, the flow port 68 is aligned with and forms part of the flow passage 52, thus allowing liquid to flow through the flow passage. In the closed position of the valve, the flow port 68 is misaligned with passage 52 and extends transversely to the passage such that the valve plug 66 blocks flow through the length of the flow passage between the opposite end connectors 44 and 48.

As shown in FIG. 4, the valve body 42 is provided with a pair of annular grooves 70 and 72 which are located respectively above and below the flow passage 52. The grooves 70 and 72 are adjacent to the valve chamber 64 and extend completely around it. Upper and lower o-rings 74 and 76 are fitted closely in the respective grooves 70 and 72 and seal against the respective upper and lower end portions of the valve plug 66.

Immediately below the lower groove 72, an annular shoulder 78 is presented in valve body 42. An annular washer 80 seats on shoulder 78 and is pressed against the adjacent o-ring 76 by an enlarged flange 82 formed on the lower end of the valve plug 66. The flange 82 fits closely within an annular skirt 84 formed on the lower portion of the valve body 42.

Another annular washer 86 seats on a flat surface 87 formed on top of the valve body 42 immediately above the upper groove 70. A retainer ring 88 is snapped into an annular groove 90 which extends around the valve plug 66 near its top end. Ring 90 acts against the top of washer 86 and presses the washer against the upper o-ring 74 in order to maintain an effective seal between o-ring 74 and the valve plug 66. Similarly, the retainer ring 88 assures that flange 82 is maintained in engagement with the lower washer 80 such that the lower washer squeezes the lower o-ring 76 in a manner to effect a fluid tight seal against the valve body 66.

As best shown in FIG. 2, an arcuate slot 92 is formed through the skirt 84 and extends through an arc slightly greater than 90°. At the opposite ends of the slot 92, the skirt 82 presents edges 94 and 96 which serve as stops that limit the operating arc of the valve plug 66 to 90°. Projecting radially from the flange 84 is a lever arm 98 which extends outwardly through slot 92. The valve plug 66 is moved between it open and closed positions by moving the arm 98 between the positions shown in solid lines and broken lines in FIG. 3. In the solid line position, one edge of arm 98 engages edge 96, and this precludes additional rotation of arm 98 and plug 66 in a clockwise direction, as viewed in FIG. 3. In the closed position, one edge of arm 98 engages the other edge 94 of slot 92, and this prevents additional rotation of the valve plug in a counterclockwise direction, again as viewed in FIG. 3. Rotational movement of the valve plug 66 between it open and closed positions is thus restricted to 90°.

An actuating system for the valve 24 is provided in order to allow the valve to be remotely manipulated between its open and closed positions from the operator's station immediately behind the console 16 (FIG. 1). The actuating system includes a control cable which is generally identified by numeral 100 in FIG. 1 and which includes a stiff control wire 102 (see FIGS. 2-4) which may be extended and retracted within a sheath 104. The sheath 104 is fixed to a bracket 106 mounted on the valve body 42. One end of wire 102 connects with a push/pull control knob 108 which is mounted on the control panel 18 (see FIG. 1). As shown in FIGS. 2-4, the opposite end of wire 102 is bent or hooked at 110 through a slot 112 formed through the lever arm 98.

When the control knob 108 is pulled outwardly, wire 102 is pulled in order to pull arm 98 until it seats against edge 96, thus moving valve plug 66 to its open position. The edge 96 provides a positive stop which assures that the valve plug will rotate to the fully open position. When knob 108 is pushed inwardly, wire 102 is pushed or extended to push arm 98 to the broken line position of FIG. 3, in which the arm is disposed against the other edge 94. This moves valve plug 66 to the closed position. Again, edge 94 provides a positive stop which assures that the valve plug 66 will be rotated through its complete 90° operating arc to the fully closed position.

In operation, the valve 24 controls the flow of water to and from the livewell 22.. In order to pump fresh water from the lake or other body of water into the livewell 22, the pump 34 is activated and plug 66 is moved to the open position. Then, water from the lake is able to flow through the flow passage portion 56 and the flow port 68 and the pump inlet passage 60 to the suction side of the pump, and from the discharge side of the pump through hose 36 to the spray nozzle 38 which discharges the fresh incoming water into the livewell 22. The water is aerated as it is sprayed into the livewell. It is again pointed out that the flow passage portion 56 is considerably larger than portion 54. Accordingly, as the livewell begins to fill with fresh water, the relatively small flow passage portion 54 provides a significant flow restriction which prevents appreciable amounts of water from being pumped out of the livewell. Consequently, water continues to be pumped from the lake or other body of water until the livewell is filled to the desired level.

The valve 24 can then be manipulated to close valve plug 66. If the pump 34 remains energized, it will draw water out of the livewell through the drain fitting 30, hose 32, the flow passage portion 34 and the pump inlet passage 60, and the water will be returned to the livewell through the supply hose 36 and the spray nozzle 38. In this manner, the water will be continuously recirculated in order to prevent it from standing and to provide additional aeration for the benefit of the fish.

If the pump 34 is de-energized with valve 24 closed, the water in the livewell will simply remain in the livewell and will not be recirculated. If the pump is de-energized and valve 24 is opened, the water in the livewell will be drained through the drain fitting 30, the drain hose 32, the flow passage 52, flow port 68, hose 28 and the fitting 26. In this manner, the livewell can be drained of water at the end of the day or whenever there is no need for water in the livewell.

By reason of the effective seals that are provided by the o-rings 74 and 76, valve 24 is substantially fluid tight and will not leak in a manner that would permit inadvertent depletion of the water in the livewell 22. The o-rings are maintained in a compressed condition to provide continuously effective seals by the action of the backing washers 80 and 86. It is also pointed out that the construction of valve 24 and its strategic location within the plumbing system for the livewell permits the valve to control three different functions, namely the provision of incoming fresh water to the livewell, recirculation of the water and drainage of the water, all with a valve which has only the two positions, open and closed From the foregoing, it will be seen that this invention is one well adapted to attain all the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative and not in a limiting sense.

Having thus described the invention, what is claimed is:

1. A valve for controlling waterflow to and from a livewell in a fishing boat, said valve comprising:
   a valve body having a flow passage therethrough and a substantially cylindrical valve chamber intersecting said flow passage, said valve body being arranged to accommodate a flow of water between a body of fresh water and the livewell when said flow passage is open;
   a substantially cylindrical valve plug having a longitudinal axis and a flow port extending therethrough perpendicular to said axis, and opposite longitudinal ends between which said flow port is located, said valve plug being mounted in said valve chamber for axial rotation between an open position wherein said port is aligned with said flow passage to allow flow therethrough and a closed position wherein said port is misaligned with said flow passage and said valve plug blocks said flow passage;
   seal means for effecting fluid tight seals between said valve plug and said valve body at locations between said flow port and each said end of said valve plug, said seal means including an annular groove located in and coaxial with said valve chamber in proximity to each of said ends of said plug, an O-ring mounted in each of said grooves, and means mounted on said valve plug in proximity to said ends thereof for compressing an associated one of said O-rings against said groove; and
   means for effecting rotation of said valve plug between said open and closed positions from a location remote from said valve body.

2. The valve of claim 1, including:
   opposite ends of said valve body presenting first and second end portions of said flow passage; and
   a pump inlet passage in said valve body intersecting with said flow passage at a location between said valve chamber and said second end portion of said flow passage, said pump inlet passage being adapted for connection with a source of suction to pump water therethrough from said flow passage.

3. The valve of claim 2, wherein the cross-sectional flow area of said first end portion of said flow passage is larger than the cross-sectional flow area of said second end portion.

4. The valve of claim 1, further comprising:
   an annular shoulder on said valve body adjacent to and coaxial with each said groove, each said shoulder being spaced further from said flow passage than the associated one of said grooves is spaced from said flow passage; and wherein said means for compressing said O-rings comprises:
   an annular retainer element coaxially mounted about said cylindrical valve plug in proximity to each of said ends thereof, each of said retainer elements seating on an associated one of said shoulders and acting against the associated one of said O-rings to retain said O-ring in the associated one of said grooves.

5. The valve of claim 4, wherein said means for compressing said O-rings further comprises:
   an annular flange on one of said ends of said valve plug engaging one of said retainer elements;
   annular groove means in said valve plug on the other of said ends thereof; and
   a retainer ring in said groove means engaging the other of said retainer elements and holding said valve plug in a manner to maintain said flange against said one retainer element.

6. The valve of claim 5, wherein said rotation effecting means comprises:
   an actuating lever arm on said valve plug extending radially from said flange; and
   means for applying a force to said lever arm in a manner to rotate said valve plug between the open and closed positions.

7. The valve of claim 6, including stop means for limiting movement of said lever arm to an arc of approximately 90°.

8. The valve of claim 1, wherein said rotation effecting means comprises:
   a lever arm extending radially from said valve plug; and
   means for applying a force to said lever arm in a manner to rotate said valve plug between said open and closed positions.

9. The valve of claim 8, including:
   an opening in said valve body through which said lever arm extends; and opposite ends of said opening providing stop surfaces for engaging the lever arm in a manner to limit movement thereof to an arc of approximately 90°.

10. The valve of claim 8, wherein said force applying means comprises an extensible and retractable cable connected with said lever arm in a manner to effect arcuate movement of said lever arm, and therefore said valve plug, between said open and closed positions of said valve plug.

11. A valve for controlling water flow to and from a fishing boat livewell having a pump with suction and discharge sides, a supply line extending to the livewell from the discharge side of the pump, a drain line extending from the livewell, and a fresh water inlet line connected with a body of fresh water, said valve comprising:

a valve body having a flow passage therethrough, said flow passage having opposite first and second end portions and a pump inlet passage at a location between said first and second end portions, said first and second end portions having first and second cross-sectional flow areas, respectively, said first flow area being larger than said second flow area, whereby for a given fluid velocity, a smaller fluid flow rate will pass through said second end portion than will pass through said first end portion;

a valve chamber in said valve body intersecting with said flow passage at a location between said first end portion and said pump inlet passage;

a a valve element mounted in said valve chamber for movement between an open position wherein flow through said flow passage is permitted and a closed position wherein flow between said first end portion of the flow passage and said pump inlet is prevented;

means for connecting said first end portion with the fresh water inlet line;

means for connecting said second end portion with the drain line; and means for connecting said suction side of the pump with said pump inlet passage to pump water into the livewell through the inlet and supply liens when the pump is activated with said valve element in said open position and to effect circulation of water from the livewell through the drain and supply lines when the pump is activated with said valve element in said closed position.

12. The valve of claim 11, wherein said valve element is mounted in said valve chamber for rotation and presents a flow port which is aligned with said flow passage in said open position and misaligned with said flow passage in said closed position.

13. The valve of claim 12, wherein:

said valve chamber has a substantially cylindrical configuration; and said valve element comprises a substantially cylindrical valve plug mounted in said valve chamber for axial rotation and having a flow port which is aligned with said flow passage in said open position and misaligned with said flow passage in said closed position, said valve element having opposite end portions sealed to said valve body.

* * * * *